March 9, 1948. A. C. FLEIG 2,437,248
RATTRAP
Filed Sept. 6, 1945 2 Sheets-Sheet 1
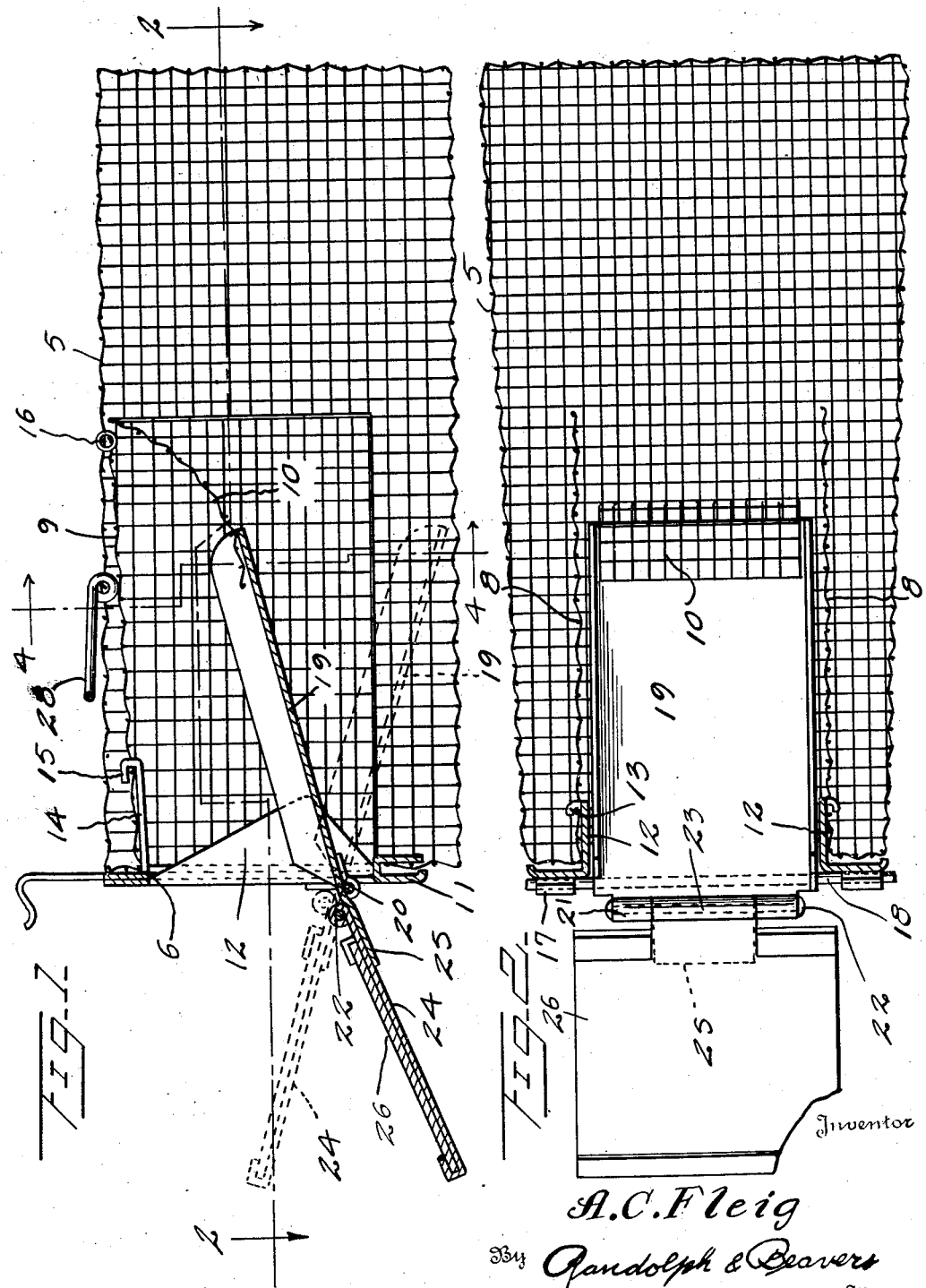
Inventor
A. C. Fleig
By Randolph & Beavers
Attorneys March 9, 1948. A. C. FLEIG 2,437,248
RATTRAP
Filed Sept. 6, 1945 2 Sheets-Sheet 2
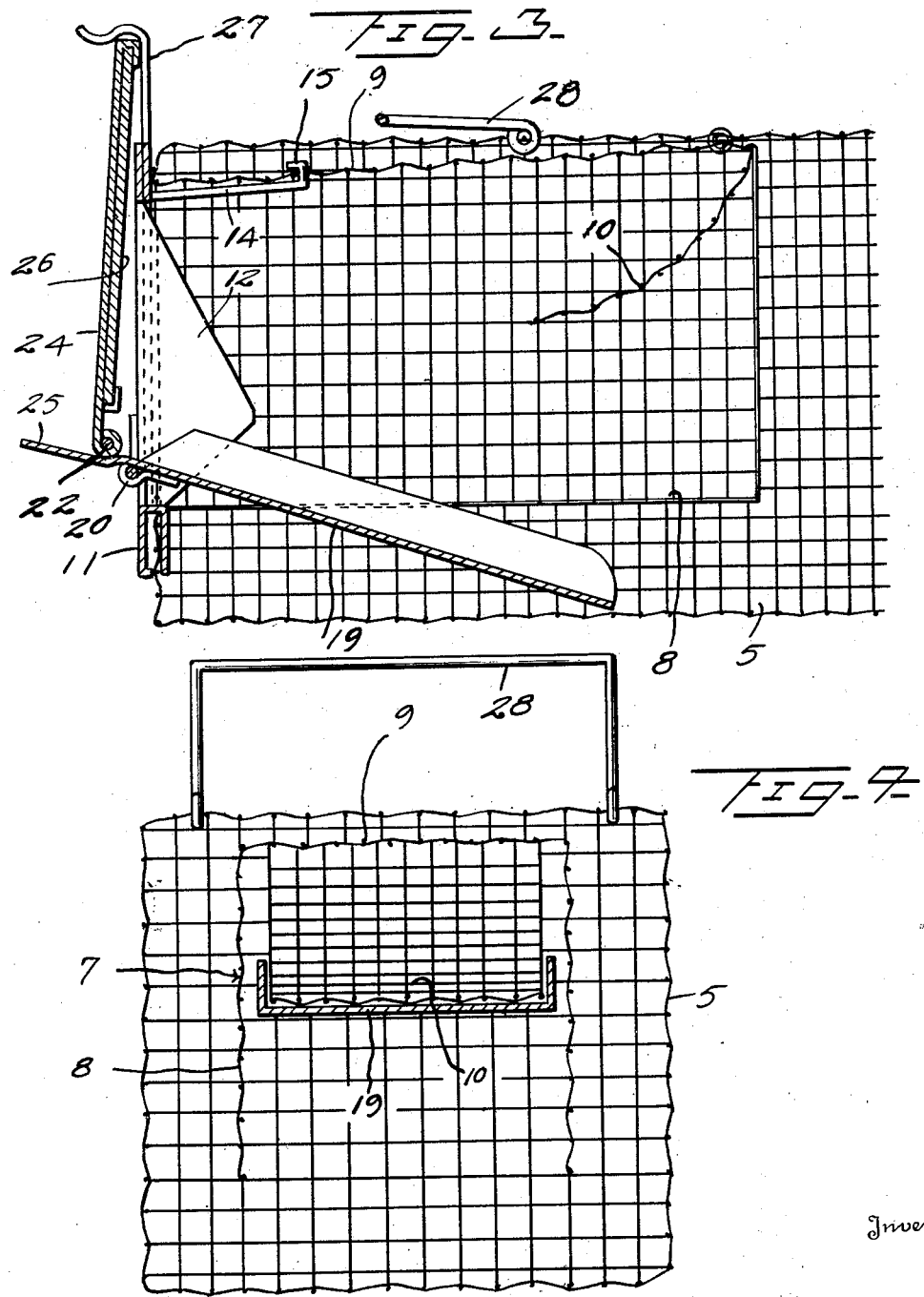
Inventor
A.C. Fleig
By Randolph & Beavers
Attorneys Patented Mar. 9, 1948

2,437,248

UNITED STATES PATENT OFFICE 2,437,248

RATTRAP

Arthur C. Fleig, Orange, Tex.

Application September 6, 1945, Serial No. 614,634

4 Claims. (Cl. 43—69)

1

The present invention relates to new and useful improvements in traps adapted for entrapping small animals, such as rats and the like and the invention has for its primary object to provide a trap of this character of the tilting platform type operable by the animal to admit the animal into the trap and including an outwardly projecting ramp or chute counterbalancing the platform to close the platform against escape of the animal, said ramp or chute functioning as a closure for the entrance of the trap while the trap is being handled to prevent escape of the animal independently of the platform when the latter is in its closed position.

A further important object of the invention is to provide a trap of this character by means of which the trap, with the animal entrapped therein, may be safely handled and carried to a suitable location for immersing the trap in water or for otherwise disposal of the animal.

A still further object of the invention is to provide a trap of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming a part hereof, wherein like numerals refer to like parts throughout and in which:

Figure 1 is a longitudinal sectional view.

Figure 2 is a sectional view taken substantially on line 2—2 of Figure 1.

Figure 3 is an enlarged longitudinal sectional view of the front end of the trap and showing the ramp or chute in closed position and Figure 4 is a transverse sectional view taken substantially on a line 4—4 of Figure 1.

Referring now to the drawings in detail wherein for the purpose of illustration I have disclosed a preferred embodiment of the invention. The numeral 5 designates the trap enclosure which is preferably of substantially rectangular formation and constructed of wire mesh or other reticulated material, one end of the trap being provided with an entrance opening 6 having its lower edge positioned above the bottom of the trap.

A portion of the wire material at the upper and side edges of the entrance opening 6 extends inwardly of the trap to provide a passage 7 which includes sidewalls 8 and a top 9, the bottom of the passage being open at the bottom edges of the sidewalls 8 terminating above the bottom of the

2 trap. The inner end of the passage 7 is curved forwardly as indicated at 10 in a direction toward the opening 6 to provide a relatively short inner end wall for the passage.

A sheet metal frame 11 is secured at the edges of the entrance opening 6, the frame including inwardly projecting wings 12 at the sides of the opening having hooks 13 at the inner edges of the wings engaging the sidewalls 8 of the passage 7 to reinforce and brace the latter and the upper edge of the frame 11 is likewise formed with an upper inwardly projecting wing 14 also having a hook 15 at its inner edge engaging the top 9 of the passage to likewise support the passage.

The inner ends of the passage 7 may also be attached to the top of the trap 5 by means of a fastening member 16.

Bearings 17 are secured to the side edges of the frame 11 adjacent the lower edges of the entrance opening 6 and in which the ends of a rod 18 are journalled extending transversely across the lower edge of the entrance opening and an inwardly projecting platform 19 has a portion of its outer edge rolled to provide bearings 20 pivoted on the rod 18.

The outer edge of the platform 19 is also rolled to provide hinge bearings 21 having a hinge pin 22 journalled therein and on which the rolled edge 23 of an outwardly extending ramp or chute 24 is pivotedly mounted.

A portion of the lower edge of the platform 19 also projects outwardly beyond the pin 22 to provide a stop 25 underlying the ramp or chute 24 to limit downward pivotal movement of the ramp relative to the platform.

The ramp of the platform is provided with a weighted plate 26 on its upper surface to counterbalance the platform 19.

A spring catch 27 projects upwardly from the upper edge of the frame 11 and adapted for releasable engagement with the outer edge of the ramp or chute 26 when the latter is moved upwardly against the outer end of the trap for closing the entrance opening 6 in the manner as illustrated in Figure 3 of the drawings.

In the operation of the device when the ramp or platform 24 is released from the catch 27 the ramp will drop downwardly in front of the trap and by reason of its engagement with the stop 25 the platform 19 will be raised upwardly with its inner end underlying the lower edge of the reduced inner wall 10 of the passage 7.

Accordingly a rat or other animal may walk upwardly along the ramp or chute 26 onto the platform 19 whereupon the weight of the animal will tilt the platform 19 downwardly into the dotted line position as shown in Figure 1 of the drawings whereby the animal may enter the trap beyond the passage 7 and upon leaving the platform 19 the weighted ramp or chute 24 will again raise the platform 19 into a position as shown by the full line position in Figure 1 of the drawings, the side edges of the platform moving upwardly between the walls 8 of the passage 7 and under the inner end wall 10 of the passage whereby to prevent escape of the animal from the trap.

When it is desired to carry the trap by the handle 28 for disposal of the animal the ramp or chute 24 is swung upwardly against the front of the trap for closing the entrance opening 6, the ramp or chute being retained in position by the catch 27. The entrance 6 is thus closed by the ramp or chute 24 independently of the platform 19, which might swing away from the inner end 10 of the passage 7 while the trap is being handled.

It is believed that the details of construction, manner of use and advantages of the device will be readily understood from the foregoing without further detailed explanation.

While the foregoing specification sets forth the invention in specific terms, it is to be understood that numerous changes in the shape, size and materials may be resorted to without departing from the spirit and scope of the invention as claimed hereinafter.

Having thus described the invention, what I claim is:

1. An animal trap of the class described comprising an enclosure having an entrance opening, a platform pivoted at the lower edge of the opening and projecting into the enclosure, a counterbalancing ramp pivoted to the outer end of the platform and adapted to normally maintain the platform in a raised position, said ramp being movable into a position for closing said opening, and catch means for securing the ramp in its closed position.

2. An animal trap of the class described comprising an enclosure having an entrance opening, a platform pivoted at the lower edge of the opening and projecting into the enclosure, a counterbalancing ramp pivoted to the outer end of the platform and adapted to normally maintain the platform in a raised position, said platform closing exit of the animal from the enclosure when the platform is raised, said ramp being movable independently of the platform into a position for closing said opening, and catch means for securing the ramp in its closed position.

3. An animal trap of the class described comprising an enclosure having an entrance opening, a passage leading inwardly from said opening, said passage being open at its bottom, a platform pivoted at the lower edge of the opening and projecting inwardly of the enclosure and adapted to close the bottom of the passage, said platform being responsive to the weight of an animal entering the opening to swing downwardly to admit the animal from the passage into the enclosure, and a counterbalancing ramp pivoted to the outer edge of the platform and adapted to raise the latter into its closed position, said ramp being movable against the outer side of the enclosure for closing said opening.

4. An animal trap of the class described comprising an enclosure of reticulated material and having an entrance in one wall, a passage also formed of reticulated material and extending inwardly from the entrance, said passage being open at its bottom, a frame at the edges of the entrance opening, wings projecting inwardly at the sides and top of the frame and attached to the sides and top of the passage to support the latter in the enclosure, a platform pivoted at the lower edge of the frame and projecting into the passage for closing the bottom thereof, a stop projecting from the outer end of the platform, a ramp pivoted to the outer end of the platform and resting on said stop to limit downward movement of the ramp relative to the platform, said ramp counterbalancing the platform to maintain the platform in a closed position at the bottom of the passage, said platform being moved downwardly into open position through the medium of an animal entering the passage, said ramp being swingable upwardly against the side of the trap to close the entrance opening, and means for securing the ramp in raised position.

ARTHUR C. FLEIG.

REFERENCES CITED

The following references are of record in the file of this patent:

UNITED STATES PATENTS

| Number | Name | Date |
| --- | --- | --- |
| 884,380 | Hadley | Apr. 14, 1908 |
| 331,945 | Crowe | Dec. 8, 1885 |
| 480,593 | Knecht et al. | Aug. 9, 1892 |
| 1,151,438 | Bowling | Aug. 24, 1915 |
| 1,910,291 | Johnston | May 23, 1933 |